United States Patent [19]

Takano et al.

[11] Patent Number: 5,345,372

[45] Date of Patent: Sep. 6, 1994

[54] SWITCHABLE LIGHT FIXTURE

[75] Inventors: Tsunesuke Takano; Kouichi Sinzawa, both of Tokyo, Japan

[73] Assignee: Kabushiki Kaisha T AN T, Tokyo, Japan

[21] Appl. No.: 12,131

[22] Filed: Feb. 1, 1993

[30] Foreign Application Priority Data

Feb. 10, 1992 [JP] Japan .................................. 4-057533
Jun. 29, 1992 [JP] Japan .................................. 4-194810

[51] Int. Cl.$^5$ ...................... F21V 23/04; B60Q 3/00; H01H 9/00
[52] U.S. Cl. .................................... 362/394; 362/74; 362/226; 200/16 C; 200/291; 200/325
[58] Field of Search ............... 362/61, 226, 362, 295, 362/394, 74; 200/317, 312, 291, 325, 323, 16 C

[56] References Cited

U.S. PATENT DOCUMENTS

| | | | |
|---|---|---|---|
| 4,979,083 | 12/1990 | Takano et al. | 362/155 |
| 5,043,540 | 8/1991 | Takano | 200/16 C |
| 5,051,549 | 9/1991 | Takano | 200/16 C |

FOREIGN PATENT DOCUMENTS

| | | | |
|---|---|---|---|
| 0234016 | 3/1990 | Japan . | |
| 1386669 | 3/1975 | United Kingdom | 362/61 |

*Primary Examiner*—Carl D. Price
*Assistant Examiner*—Sara Sachie Raab
*Attorney, Agent, or Firm*—Nixon & Vanderhye

[57] ABSTRACT

A switchable light fixture which may be usefully be employed as an interior automotive lighting fixture includes an insulating plate defining an interior cavity in which a sliding piece is disposed and supports an opposed pair of lamp sockets for holding a lamp. A plurality of stationary parallel contacts (at least two of which form a pair of lateral stationary contacts, and one of which forms a middle stationary contact) are positionally held by means of recessed surfaces or channels defined between respective upright supports. A pair of lateral plugs each formed by an outwardly bent terminal end portion of a respective one of the lateral stationary contacts is positioned in a respective pair of the recessed surfaces or defined channels so as to be disposed over the lateral pair of stationary contacts, with a middle plug being portioned between the pair of lateral plugs. Each of the middle stationary contact and the middle plug includes a connector strip which is connected to a respective one of the lamp sockets. A switch cover which forms an upper extent of the cavity in which the sliding piece is disposed is provided with a unitary plug cover. The switch cover positionally holds stationary contacts, while the plug cover provides a protective cover over the lateral pair of plugs and the middle plug.

7 Claims, 9 Drawing Sheets

SWITCHABLE LIGHT FIXTURE

BACKGROUND OF THE INVENTION

This invention relates to a switchable light suitable for use as an interior automotive lighting fixture.

One prior art example of an integral light fixture and switch is disclosed in Japanese Utility Model Laid-open No. 2-34016. The light fixture which is disclosed therein includes an insulating base in which a socket insertion portion is formed having opposing projections. Lamp sockets having a pair of clamps and connectors are respectively arranged on the socket insertion portions by means of the projections through attachment holes formed on clamps. A cylinder is formed into a single unit on the other side of the insulating base in close proximity to each of these lamp sockets to accommodate a switch knob. A self-protruding push switch is provided with a movable contact which makes sliding contact with a first stationary contact extending from the connectors provided on the inner wall surface of the cylinder, and another stationary contact having a connection terminal. The movable contact is mounted together with a spring inside the cylinder with the switch knob. A lamp is attached between the pair of lamp sockets in such a manner that the lamp is able to be turned on and off with the switch in correlation with said lamp sockets provided on an insulating plate.

The prior art lighting fixture of the type described above is an example o of a lighting fixture that is illuminated at all times by the operation of a self-returning returning push switch. Thus, even though it can be used as a lighting fixture in the trunk of a passenger car, for example, it cannot be used as a lighting fixture in the interior of an automobile. In addition, such a conventional lighting fixture is inconvenient since connection with the power line is achieved by soldering to a terminal. Moreover, due to the fact that the terminal itself is exposed, the terminal is capable of easy movement thereby making it unstable and dangerous.

SUMMARY OF THE INVENTION

In order to eliminate the above-mentioned problems associated with conventional lighting surfaces, the present invention provides for a lighting fixture that can be turned off when desired by the operation of a sliding switch. The lighting fixture is thus connectable to a power line in a single step during assembly through the use of a plug-in jack, and moreover, reliably supports a plug base while protecting a plug with a plug cover formed into a single unit on a switch cover.

The stationary contacts and plugs are operatively positioned with concave surfaces of a lateral surface of the insulating plate at their respective raised base portions. Moreover, the stationary contacts are held in position with grooves on the inside surface of the switch cover or with grooves in the upper edge of the cavity. In addition, the base portions of the plugs are held in position with holes formed in the plug cover. Thus, the stationary contacts are prevented from moving indiscriminately due to external disturbances, such as sliding friction that may occur with respect to the movable contact. In addition, the plugs remain stable even during insertion and removal of separately provided multijacks, and the like. A positive power electrode may thus be connected to one of the plugs while a negative electrode may be connected directly to another plug. Since the third plug is connected to a negative power electrode by means of a door switch, the lamp can be illuminated either manually or when the doors are open in dependence upon the position of the sliding piece relative to the stationary contacts. In addition, if the movable contact is further moved to a position that interrupts the short between each of the stationary contacts, the lamp can be made to remain off during the day.

PREFERRED EMBODIMENTS OF THE INVENTION

The following provides an explanation of preferred embodiments of the invention with reference to the accompanying drawings.

Figure 1:
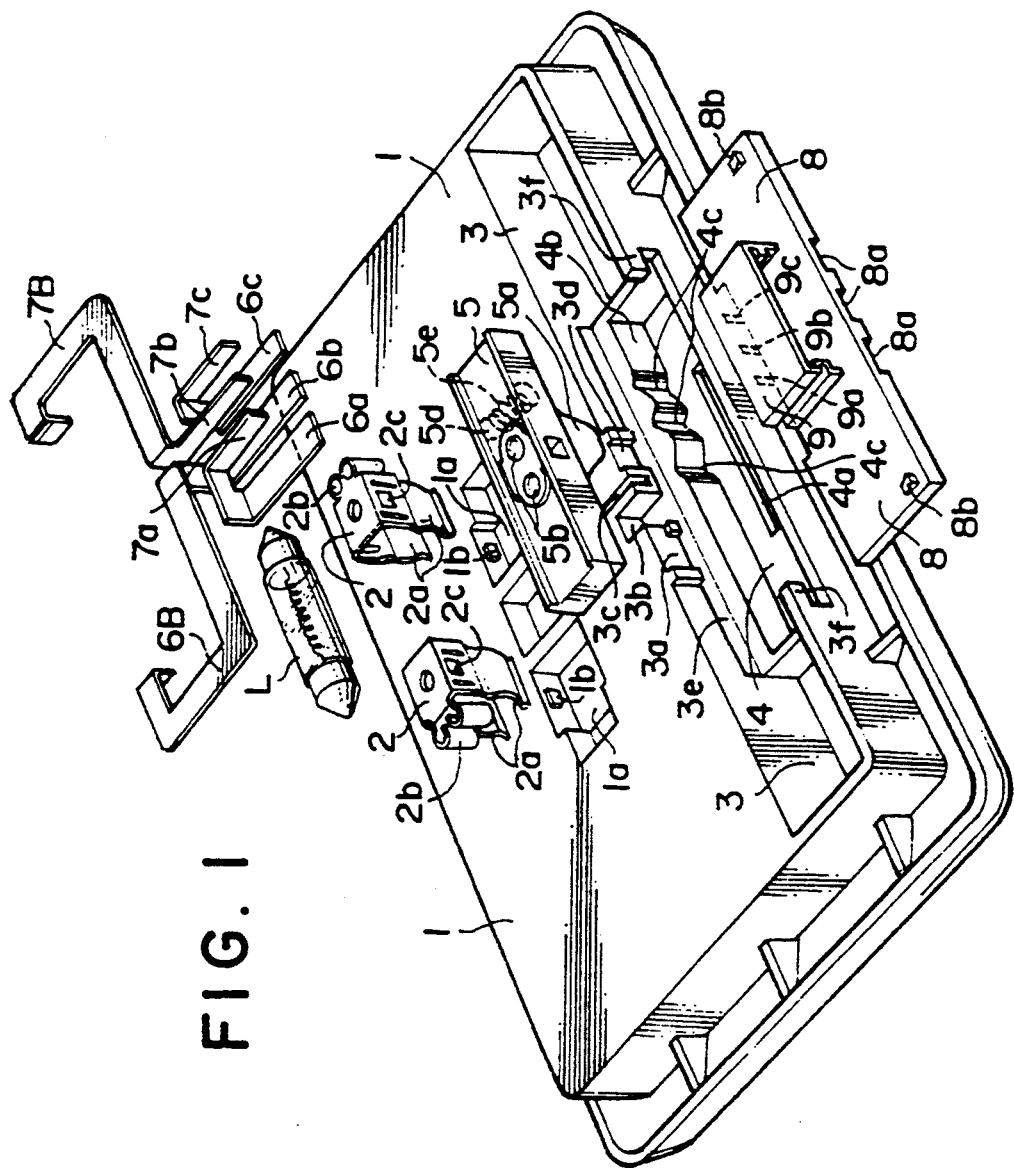
FIG. 1 is an exploded perspective view from a back side indicating one example of a lighting fixture according to this invention.
Figure 2:
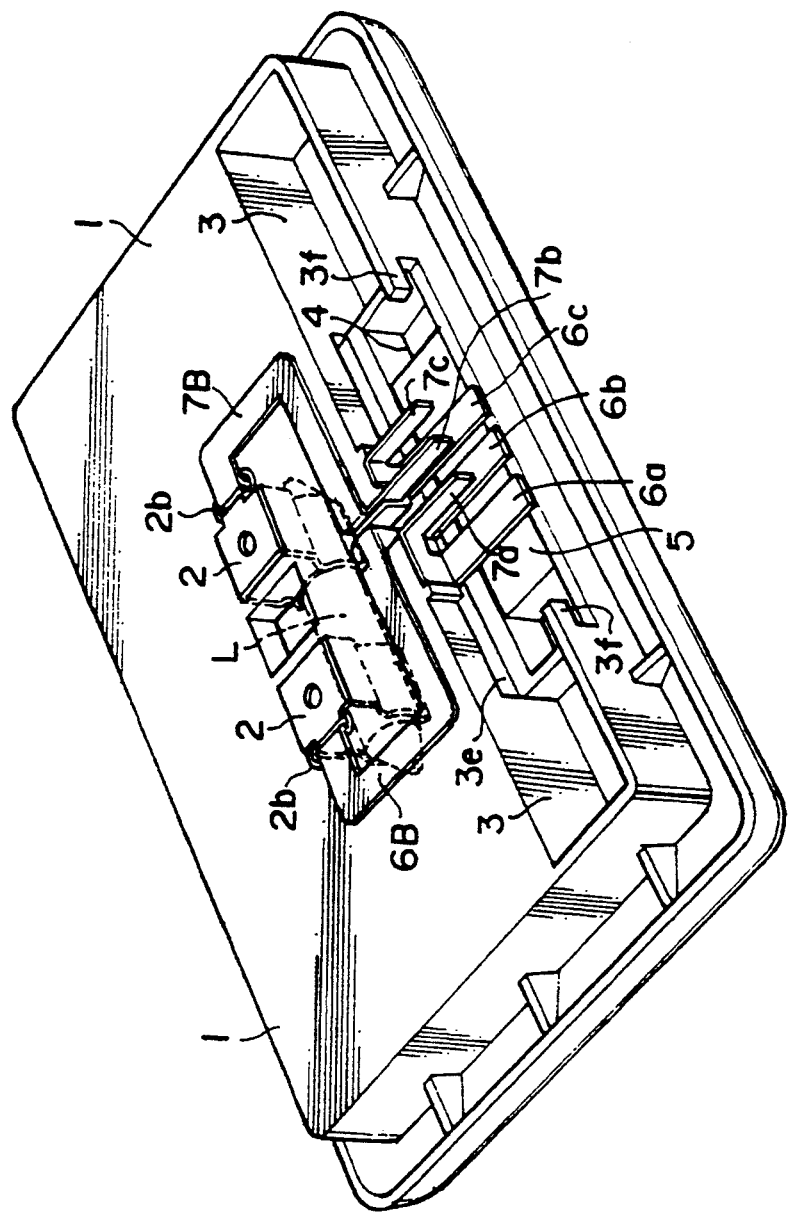
FIG. 2 is a perspective view during the course of assembly of the lighting fixture shown in FIG. 1.

As depicted in FIGS. 1 and 2, the basic configuration of this invention contains a sliding piece 5, formed of molded plastics material mounted for articulation in cavity 4 with respect to recessed surfaces 3a–3d formed in lateral edge 3 of insulating plate 1 (also formed of plastics material). The slide piece 5 includes on its lower surface a knob 5a which projects through a long, narrow oblong hole 4a defined in the center of cavity 4 as indicated in FIG. 1. The slide piece 5 has on its upper surface a metal movable contact 5b. A lamp L may be inserted into opposed metal sockets 2 positioned on the insulating plate 1 and may be turned off and on by means of a switch (not shown) connected to the sockets 2 (see FIG. 2).

A plurality of metal stationary contacts 6c–6c that make contact with the movable contact 5b are arranged in parallel and are positioned within a respective one of the recessed surfaces 3a–3d formed in lateral edge 3 of insulating plate 1.

Figure 4:
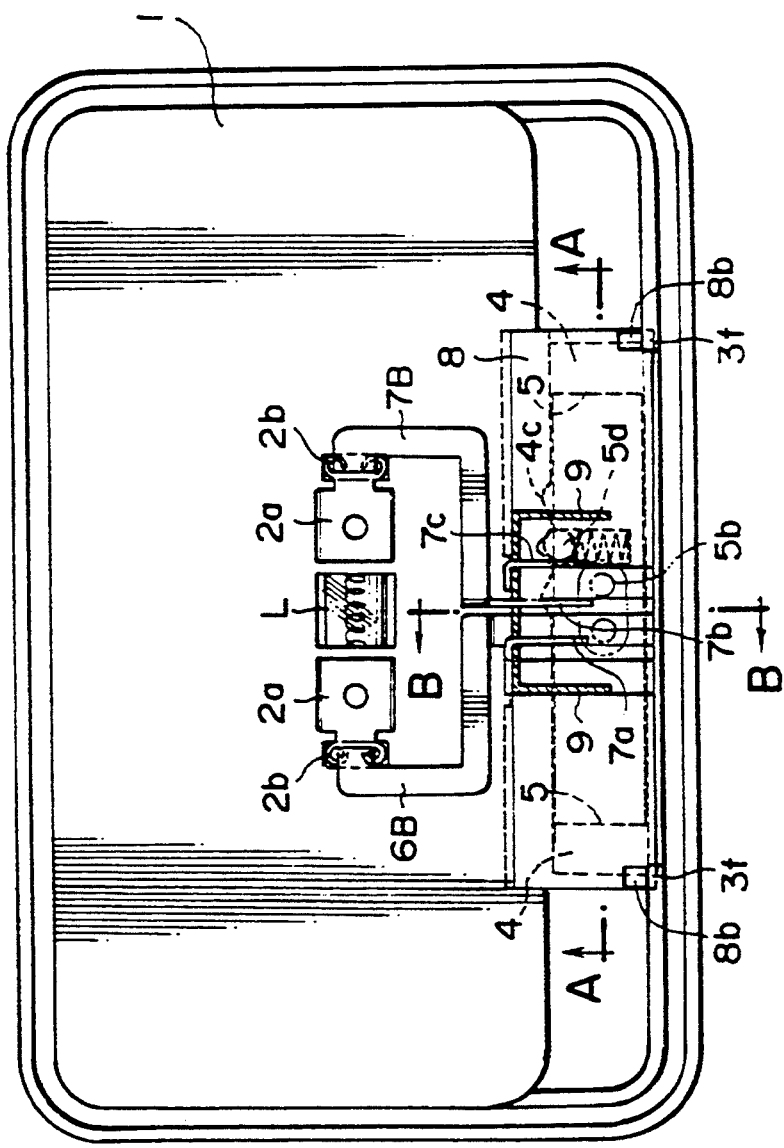
FIG. 4 is a bottom view of the lighting fixture shown in FIG. 1.

Plugs 7a and 7c are formed by outwardly bending terminal ends of the respective raised portions of stationary contacts 6a and 6c (see FIGS. 1, 2 and 4).

The bend terminal end portion forming stationary contact 6b which is positioned in surface 3b is plugged into and operatively connected with the connector 2b of one of the sockets 2 by means of connector strip 6B. In addition, the bent end portion forming plus 7b and disposed in concave surface 3c between the plug pieces 7a and 7c, is plugged into and connected with connector 2b of the other socket 2 by means of strip connector 7B (see FIGS. 2 and 3).

Figure 3:
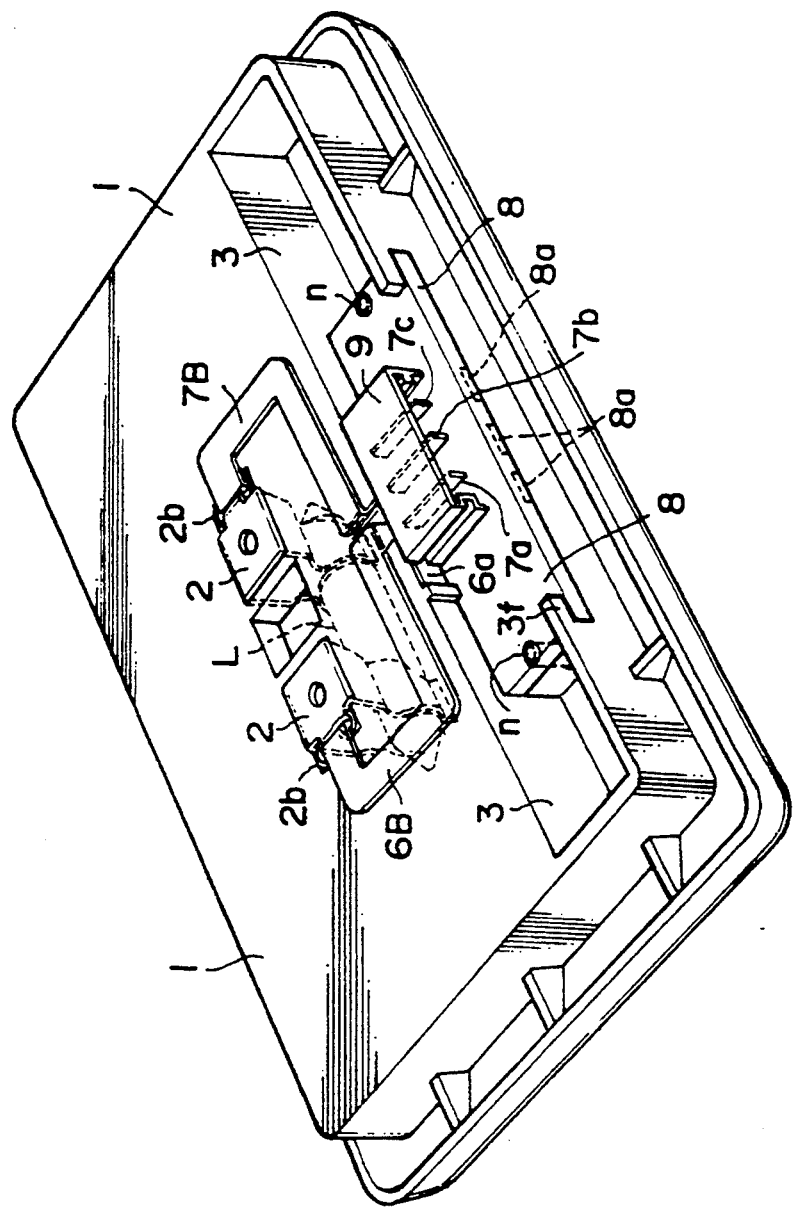
FIG. 3 is a perspective view of the lighting fixture shown in FIG. 1 at a point later in the assembly process.
Figure 5:
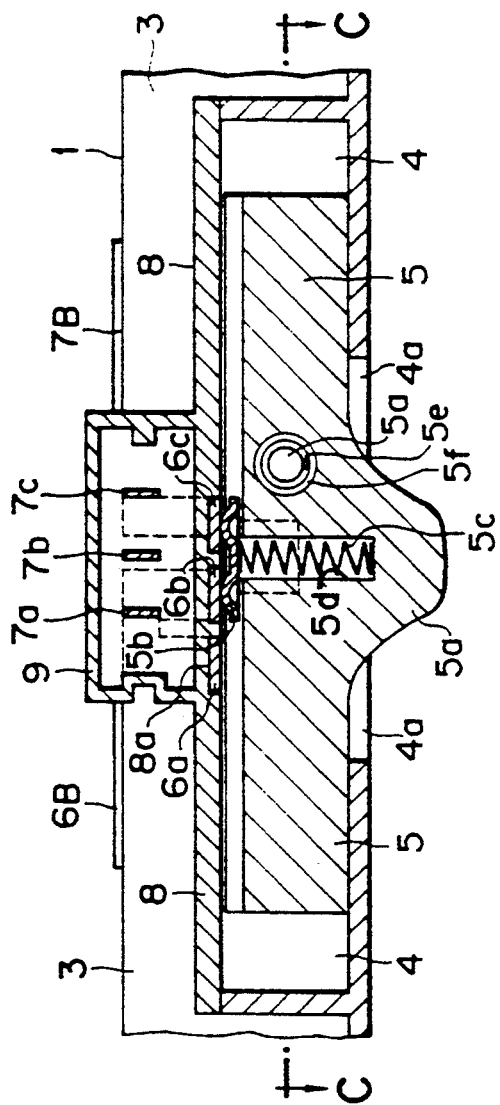
FIG. 5 is a partial enlarged cross-sectional view taken along broken line A—A in FIG. 4.

Moreover, as indicated in FIG. 5, the stationary contacts 6c–6c are held in position with, for example, grooves 8a formed on the inner surface of the switch cover 8 (made from molded plastics material) on the upper edge of the long, narrow cavity 4 as indicated in FIG. 1. Plug cover 9, which is unitary with switch cover 8, protects the plugs 7a–7c since the plugs 7a–7c are inserted through respective holes 9a–9c as indicated in FIGS. 3, 5 and 6.

Opposing projections 1b are formed in socket insertion hole la of insulating plate 1, and anchor socket 2 in the insulating plate 1 by fitting into attachment hole 2c of the socket 2. In addition, opposing clamps 2a are provided with sockets 2 for insertion of lamp L. An elongate slot 3e is defined in the insulating plate for insertion and locking of one side of switch cover 8. In this regard, a pair of locking tabs that support the other side of switch cover 8 is defined by the insulating plate 1. The inner edge 4b of cavity 4 is provided with knob regulating grooves 4c.

Figure 6:
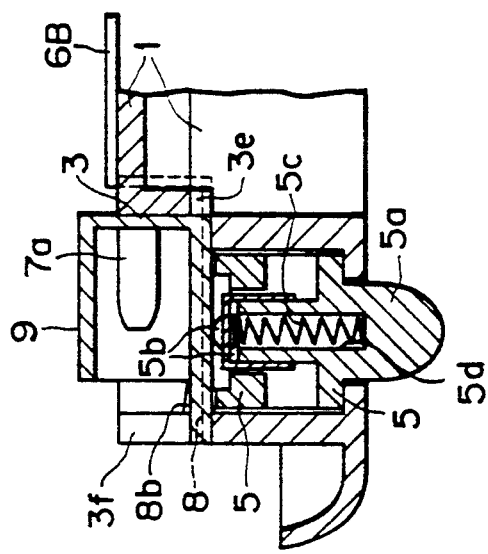
FIG. 6 is a partial enlarged cross-sectional view taken along broken line B—B indicated in FIG. 4.
Figure 7:
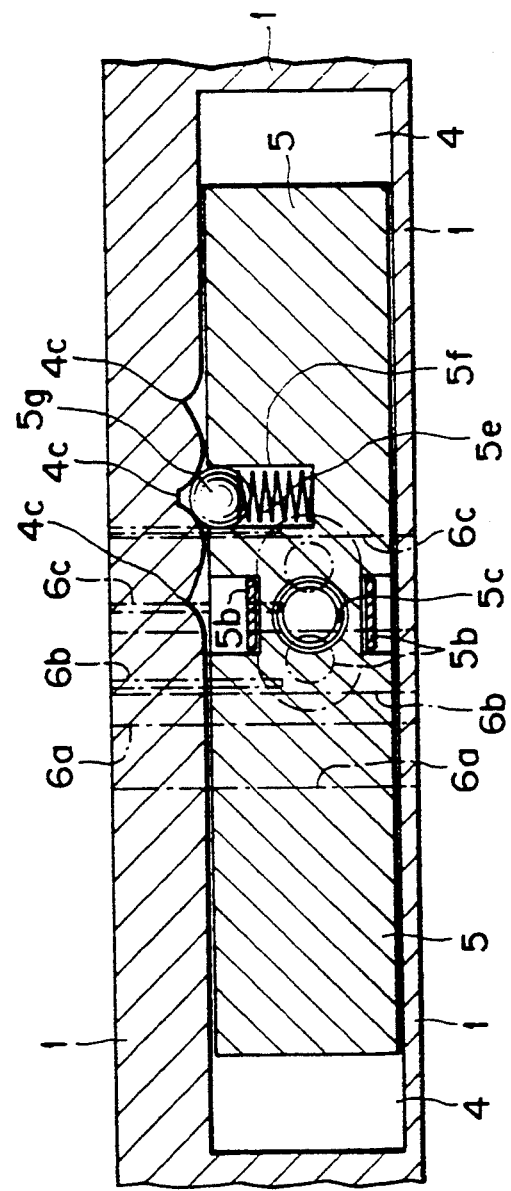
FIG. 7 is a partial enlarged cross-sectional view taken along broken line C—C indicated in FIG. 5.

As depicted in FIGS. 5 and 6, a resilient spring 5c associated with sliding contact 5b is provided in pocket 5d defined within the sliding piece 5 for resiliently pressing the sliding contact 5b against the stationary contacts 6a 6c. A movable projecting piece 5g, such as a steel ball, makes resilient contact with knob regulating grooves 4c by virtue of resilient spring 5e being provided within pocket 5f of sliding piece 5 (see FIG. 7).

Wedge-shaped projections 8b may be provided for locking switch cover 8 to tabs 3f. However, instead of the switch cover 8 being locked to tabs 3f by wedge-shaped projections 8b, the switch cover 8 may also be screwed to the upper edge of cavity 4 with locking screw n as indicated by the broken line of FIG. 3. Switch cover 8 can also be fit onto and arranged on the upper edge of cavity 4 by other known means.

Figure 11:
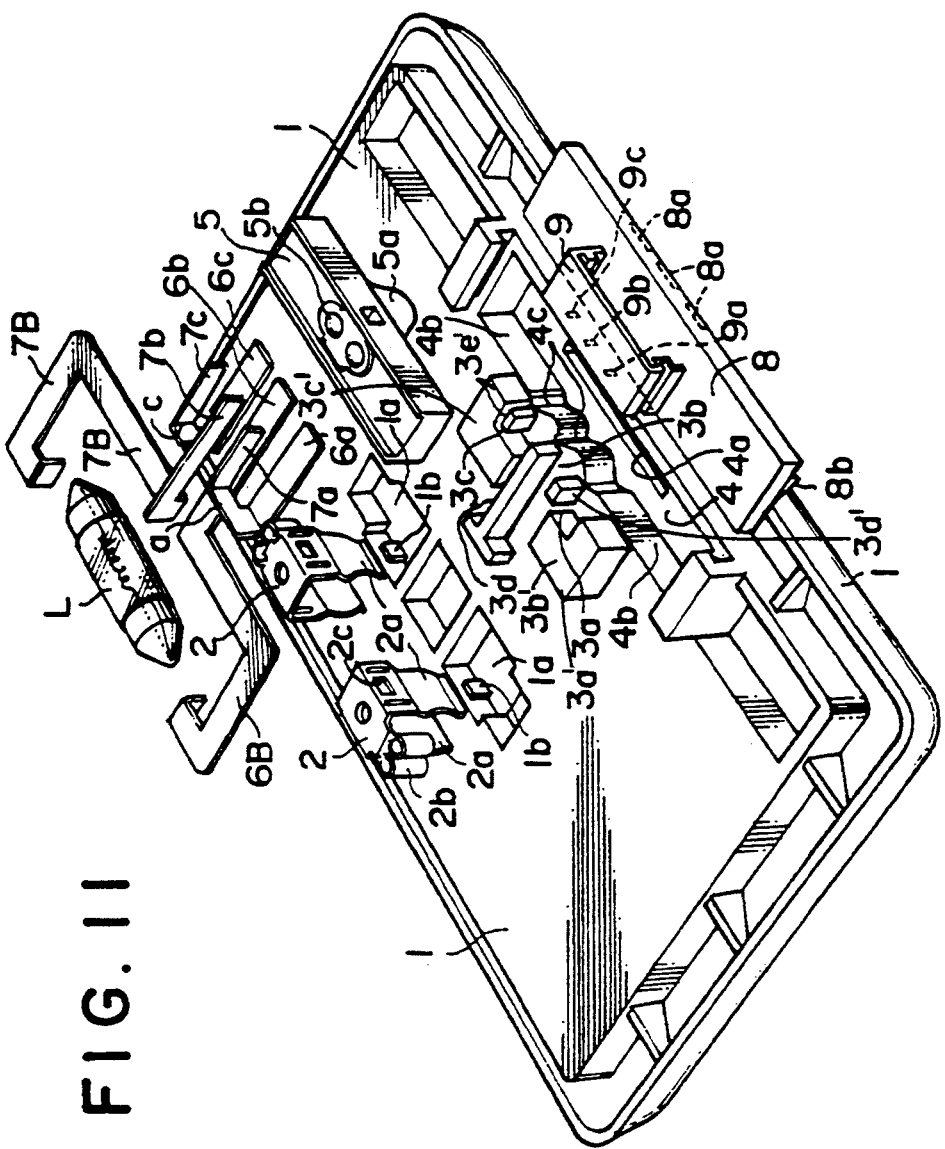
FIG. 11 is an exploded perspective view from of a back side of a lighting fixture according to another embodiment according to this invention.
Figure 12:
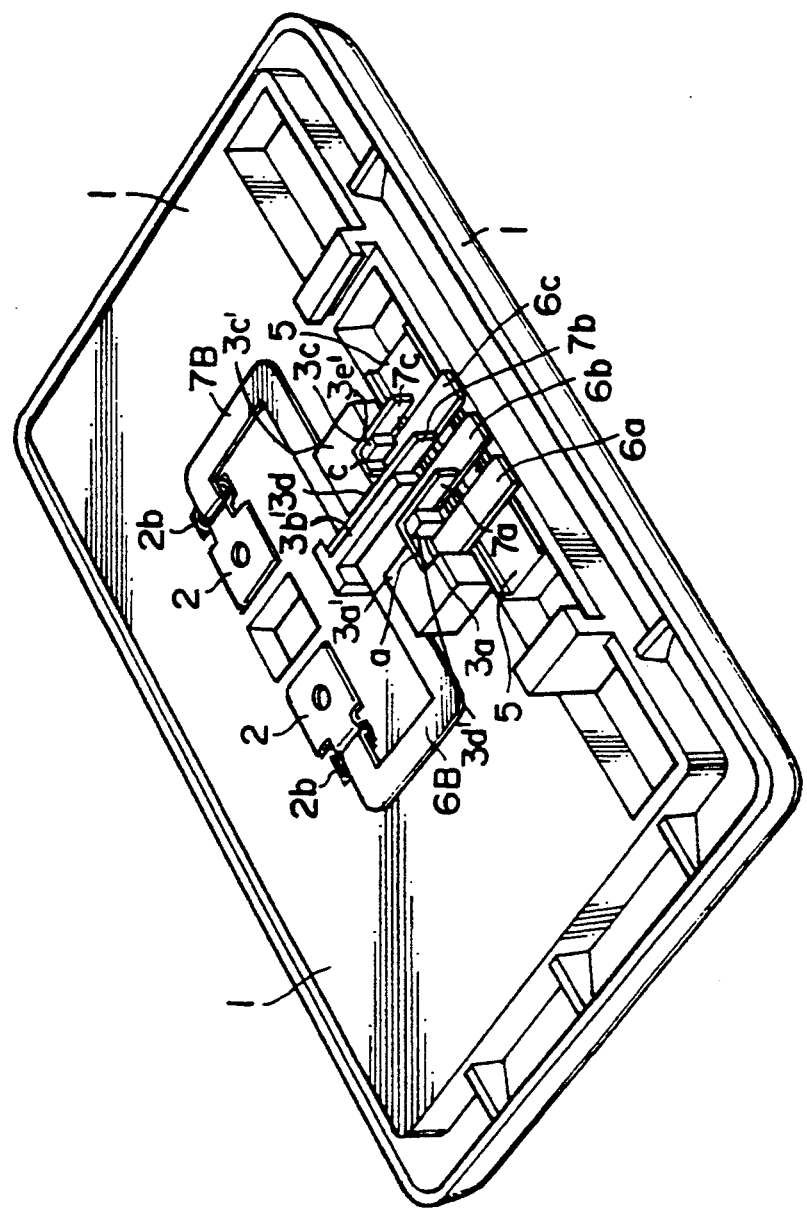
FIG. 12 is a perspective view during the course of assembly of the lighting fixture shown in FIG. 11.

The following provides an explanation of another embodiment of the invention with reference to the drawing FIGS. 11 and 12.

In this regard, as depicted in FIGS. 11 and 12, the basic configuration of this embodiment of the present invention contains a sliding piece 5 (formed of a molded plastics material) positioned for movement within cavity 4. The sliding piece includes on its lower surface a knob 5a projecting through an oblong hole 4a defined in the lower surface of insulating plate 1 (also formed from molded plastics material as indicated in FIG. 11). On its upper surface, the sliding piece 5 includes metal self-protruding movable contact 5b as shown in FIG. 12. A lamp L, may be inserted into opposed metal sockets 2 mounted on the insulating plate 1 and may be turned on and off by means of a switch (not shown) connected operatively to the sockets 2.

A plurality of metal stationary contacts 6c–6c, that make contact with said movable contact 5b, are temporarily fixed in parallel to one another by means of supports 3a'–3e' provided on the lower surface of the insulating plate 1. As a specific example, the stationary contact 6b may be presented into channel 3b between small support 3a' and the lateral edge of nearly T-shaped support 3b' protruding from the center of the lower surface of insulating place 1 as indicated in FIG. 12. The upright portion a between plug 7a and stationary contact 6a is then clamped in channel 3a between small support 3d' and the lateral edge of inverted L-shaped support 3a'.

Upright portion c between stationary contact 6c and plug 7c is thereafter clamped in channel 3c between L-shaped support 3c' and small support 3e'. Moreover, plug 7b is clamped in channel 3d between the lateral edge of T-shaped support 3b' and L-shaped support 3c'.

Thereafter, the bent end portion 7B of plug 7b is inserted into receptacle 2b of one socket 2, while the bent end portion 6B of stationary contact 6b is inserted into receptacle 2b of the other socket 2b.

Each of the stationary contacts 6c–6c and plugs 7a–7c may thus be securely pressed in opposition to the characteristic resilient force of each of the supports 3a'–3e' so as to be clamped into the channels defined between each of the supports 3a'–3e' until they make contact with the surface of the above-mentioned insulating plate 1. As a result, automated assembly using a robot arm that operates on the basis of a series of sequences employing known control means, such as microcomputer control, can be accomplished since each of the stationary contacts and plugs can be temporarily fixed and arranged in prescribed locations on insulating plate 1.

The following provides an explanation of the operation of this invention during use using the embodiment depicted in FIGS. 1–10 as an example.

Stationary contacts 6c–6c and plugs 7a–7c are positioned within recessed surfaces 3a–3d of the lateral surface 3 at their respective raised base portions. Stationary contacts 6c–6c are held in position within grooves 8a in the inner surface of switch cover 8. The bases of plugs 7a–7c can be held in position within holes 9a–9c of plug cover 9.

Thus, stationary contacts 6c–6c are prevented from moving indiscriminately due to external disturbances such as sliding friction due to the movable contact. In addition, plugs 7a–7c remain stable even during insertion and removal of multi-jacks and the like provided separately.

Figure 8:
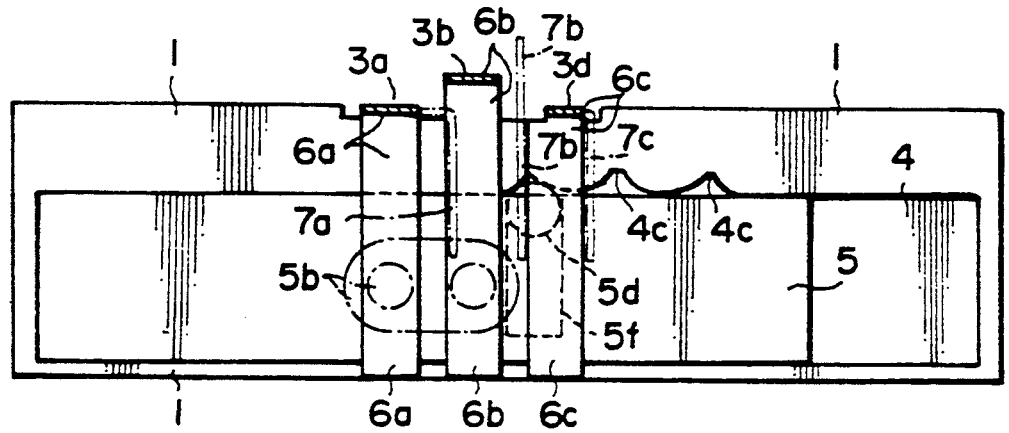
FIG. 8 is a schematic view of the switch portion shown in one of its operational states.
Figure 9:
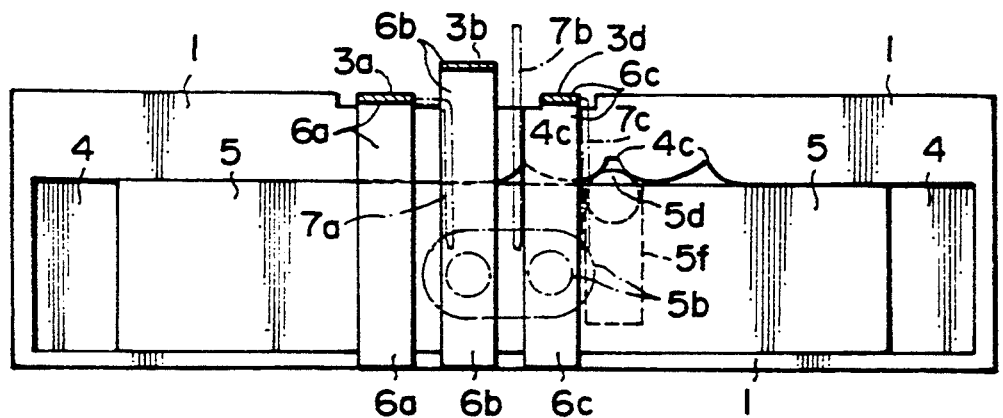
FIG. 9 is a schematic view of the switch portion having a different operational state from that depicted in FIG. 8.

By connecting a positive power electrode to plug 7b, a negative electrode to plug 7a, and a negative power electrode to plug 7c by means of a door switch, movement of the sliding piece 5 will short each of the gaps between stationary contacts 6a and 6b or 6b and 6c with movable contact 5b as indicated in FIGS. 8 and 9. As a result, lamp L can be illuminated manually or only when the doors are open.

Figure 10:
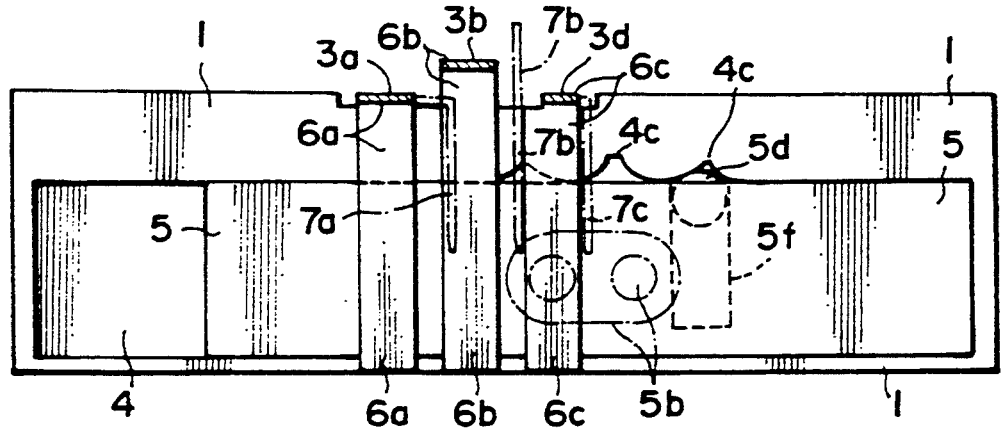
FIG. 10 is a schematic view of the switch portion having a different operational state from that depicted in FIGS. 8 and 9.

In addition, if movable contact 5b is further moved to a position that interrupts the short between each of the stationary contacts 6c–6c as indicated in FIG. 10, lamp L can be made to remain off during the day.

This invention demonstrates the advantages described below as a result of having the configuration explained above.

Since stationary contacts 6c–6c and plugs 7a–7c are positioned within recessed surfaces 3a–3d of insulating plate lateral edge 3 at their respective base portions, stationary contacts 6c–6c are held in position within grooves 8a in the inner surface of switch cover 8 or grooves in the upper edge of cavity 4, and the bases of plugs 7a–7c can be held in position within holes 9a–9c of plug cover 9. This invention may thus be used safely, reliably and easily.

In particular, stationary contacts 6c–6c are prevented from moving indiscriminately due to external disturbances such as the sliding friction due to movable contact 5b, and plugs 7a–7c remain stable even during insertion and removal of separately provided multi-jacks and the like, allowing them to be reliably connected to a power line in a one-step operation. Moreover, since plug cover 9 is formed into a single unit on the surface of switch cover 8 (a cost-saving attribute), plug cover 9 is prevented from being moved indiscriminately and is able to stably protect plugs 7a–7c.

What is claimed is:

1. A switchable light fixture comprising:

an insulting plate having a front side and a back side, said insulating plate defining an interior cavity opening towards said back side and a central hole extending between said interior cavity and said front side;

said insulating plate having a lateral edge which defines a plurality of recessed surfaces;

an opposed pair of lamp sockets supported by said insulating plate for holding a lamp therebetween;

a sliding piece positioned within said defined cavity of said insulating base for articulated movements with respect to said lateral edge of said insulating plate, said sliding piece including (1) a knob provided on a lower surface of said sliding piece which extends through said central hole, and (2) a movable contact provided on an upper surface of said sliding piece;

a plurality of stationary parallel contacts each of which is positioned in a respective one of said recessed surfaces so as to be disposed in opposition to, and capable of making contact with, said movable contact, at least two of said stationary contacts constituting a lateral pair of stationary contacts, and at least one of said stationary contacts constituting a middle stationary contact;

a pair of lateral plugs each formed by an outwardly bent terminal end portion of a respective one of said of lateral stationary contacts and positioned in a respective pair of said recessed surfaces so as to be disposed over said lateral pair of stationary contacts; and a middle plug positioned between said pair of lateral plugs; wherein said middle stationary contact and said middle plug each includes a connector strip which is connected to a respective one of said lamp sockets; and wherein said fixture further includes a switch cover forming an upper extent of said cavity for positionally holding said stationary contacts;

said switch cover includes a plug cover which defines a plurality of plug-holes through which said middle pair of plugs and said middle plug are inserted so as to provide a protective cover over said lateral pair of plugs and said middle plug; whereby a lamp held by said opposed pair of lamp sockets on said insulating plate may be turned on and off by means of a switch connected to said sockets in dependence upon a position of said movable contact relative to said stationary contacts.

2. A switchable light fixture comprising:

an insulating plate defining an interior cavity provided with a central hole;

an opposed pair of lamp sockets supported by said insulating plate for holding a lamp therebetween;

a sliding piece positioned within said defined cavity of said insulating base for articulated movements with respect to said lateral edge of said insulating plate, said sliding piece including (1) a knob provided on a lower surface of said sliding piece which extends through said central hole, and (2) a movable contact provided on an upper surface of said sliding piece;

said insulating plate having a plurality of upright supports defining a plurality of channels therebetween;

a plurality of stationary parallel contacts each of which is clamped in a respective one of said channels defined between said supports so as to be disposed in opposition to, and capable of making contact with, said movable contact, at least two of said stationary contacts constituting a lateral pair of stationary contacts, and at least one of said stationary contacts constituting a middle stationary contact;

a pair of lateral plugs each formed by an outwardly bent terminal end portion of a respective one of said of lateral stationary contacts and positioned in a respective pair of said channels defined between said supports so as to be disposed over said lateral pair of stationary contacts; and a middle plug positioned between said pair of lateral plugs; wherein said middle stationary contact and said middle plug each includes a connector strip which is connected to a respective one of said lamp sockets; and wherein said fixture further includes a switch cover forming an upper extent of said cavity for positionally holding said stationary contacts;

said switch cover includes a plug cover which defines a plurality of plug-holes through which said middle pair of plugs and said middle plug are inserted so as to provide a protective cover over said lateral pair of plugs and said middle plug; whereby a lamp held by said opposed pair of lamp sockets on said insulating plate may be turned on and off by means of a switch connected to said sockets in dependence upon a position of said movable contact relative to said stationary contacts.

3. A switchable light fixture as in claim 1 or 2, wherein said sliding piece includes a pocket, and a spring disposed within said pocket which exerts a resilient force against said movable contact.

4. A switchable light fixture as in claim 1 or 2, wherein said insulating plate includes a plurality of knob-regulating grooves.

5. A switchable light fixture as in claim 4, wherein said sliding piece includes a projecting piece, a pocket, and a spring disposed within said pocket which exerts a resilient force against said projecting piece to urge the projecting piece into contact with at least one of said knob-regulating grooves.

6. A switchable light fixture as in claim 1 or 2, wherein said insulating plate includes an elongate slot for accepting one edge of said switch cover, and a pair of locking tabs for accepting another edge of said switch cover.

7. A switchable light fixture as in claim 6, wherein said switch cover includes wedgeshaped shaped projections for locking said switch cover to said pair of locking tabs.

* * * * *